Patented Apr. 7, 1953

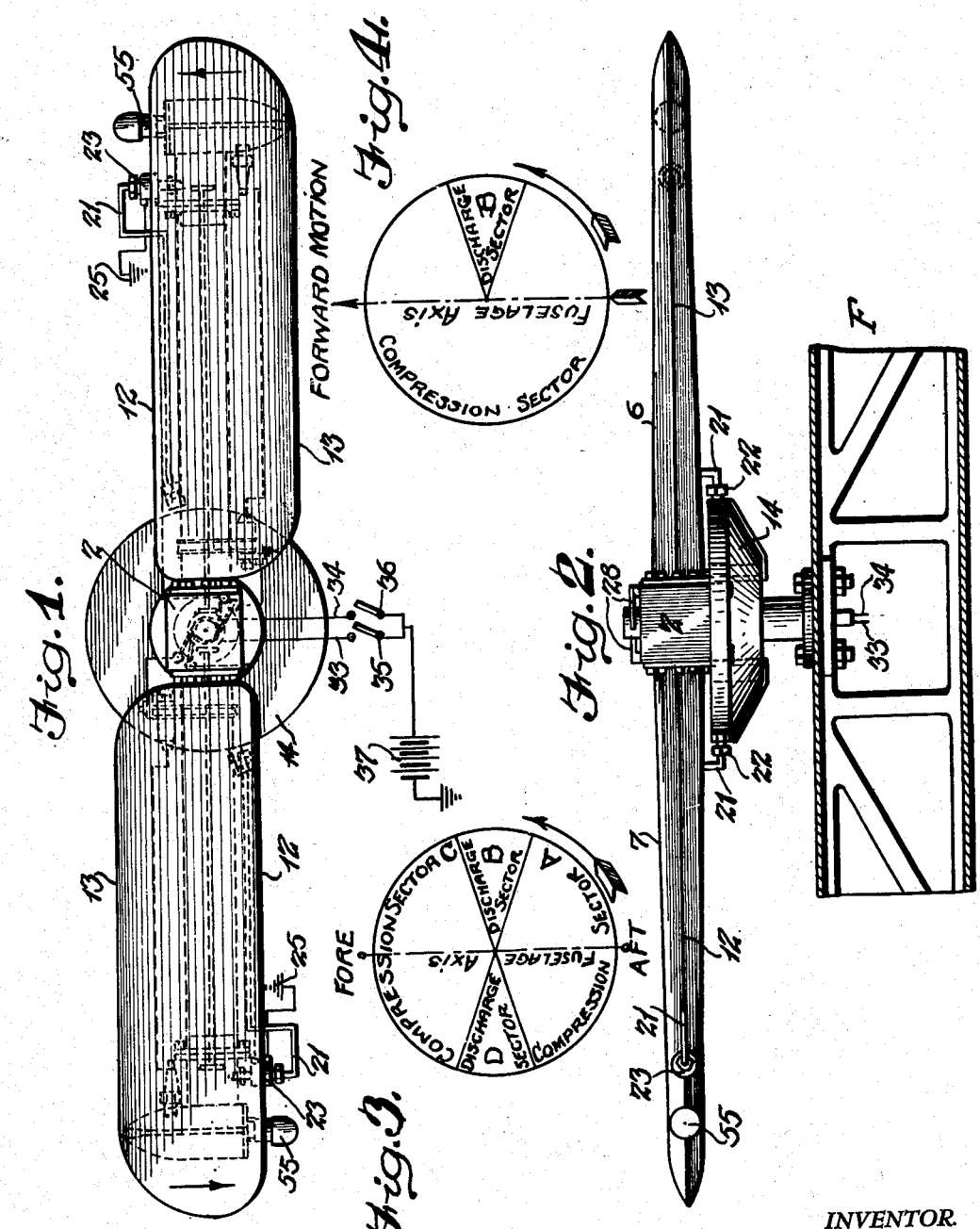

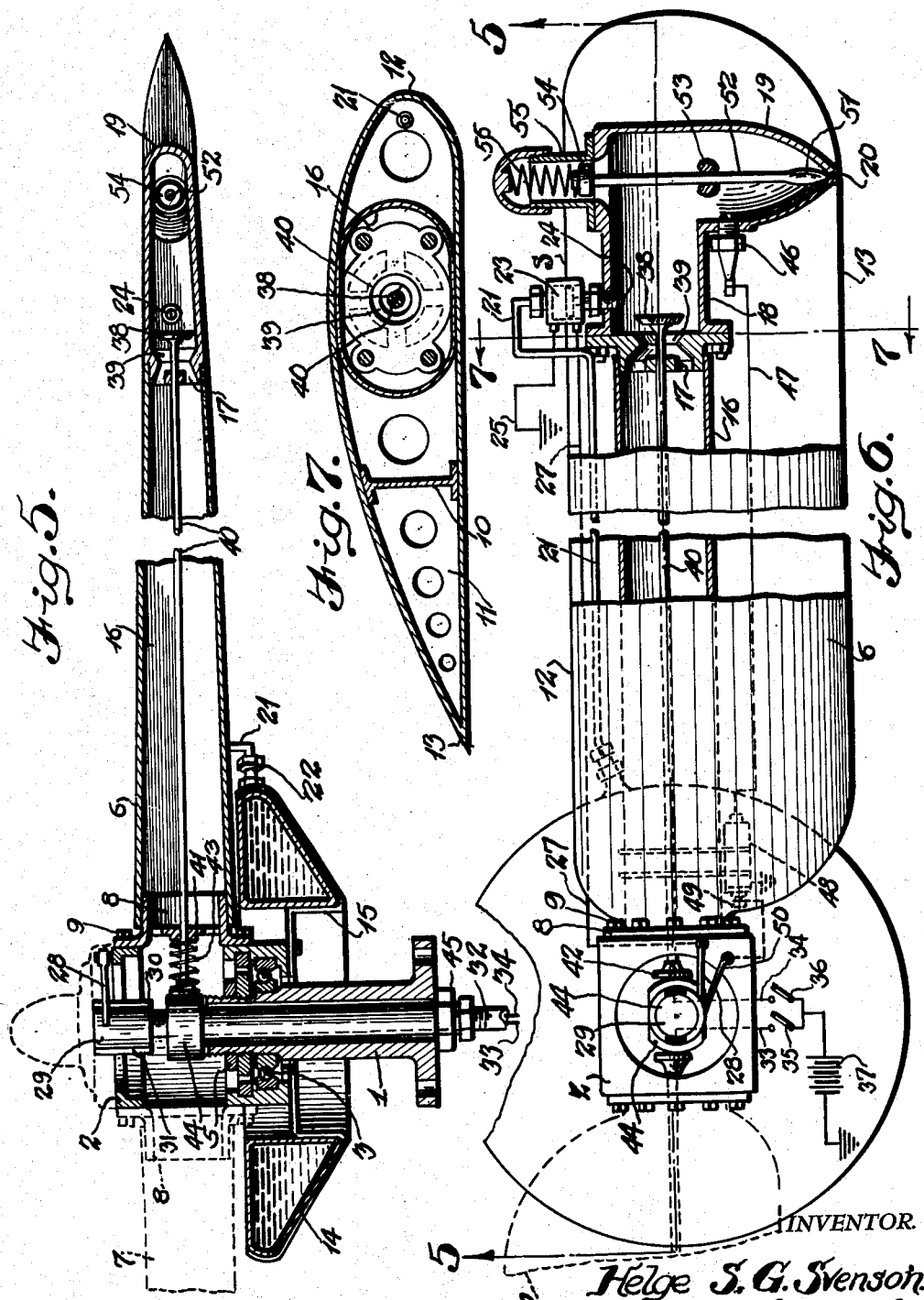

2,633,922

UNITED STATES PATENT OFFICE 2,633,922

JET-PROPULSION MECHANISM

Helge S. G. Svenson, Villavicencio, Colombia

Application April 9, 1946, Serial No. 660,675

3 Claims. (Cl. 170—135.4)

My present invention relates to jet propulsion mechanism adapted generally for use with aircraft, and more specifically to a jet-driven multi-blade rotor including in the assembly power producing units in the nature of internal combustion engines carried by the respective blades of the rotor for operating the rotor to propel the aircraft so equipped.

The rotor is especially applicable for use with autogyros or helicopters, and when this type of aircraft is equipped with the rotor mechanism, the craft is propelled in its forward motion or movement by the rotor under jet thrusts or impulses of power discharging through the respective power units located in the outer extremities of the rotor blades.

Under some conditions an aircraft may be equipped with a pair of the rotors, revolving in opposite directions, and jet-driven with power impulses discharged at diametrical points about the center of rotation of the rotors; and if desired more than one motive power plant may be installed in a blade of the multi-blade rotor.

In the equipment of an aircraft of the helicopter type means are provided for electrically controlling the motive power plants of the jet-propelled blades whereby the aircraft may be launched and caused to ascend vertically; then under control of the aviator the rotor may be regulated to direct the craft in horizontal flight; and for landing purposes the operation of the jet-driven motive-power plants may be adjusted to permit and accomplish a vertical descent of the craft.

The primary object of the invention is the provision of aircraft equipment involving a multi-blade jet-driven rotor which is simple in construction and operation, and of which each blade is equipped with a compactly arranged and self-contained internal combustion engine or motive power unit that consists in a minimum number of parts combined and co-acting to insure a maximum efficiency in the propulsion of an aircraft with a minimum expenditure of engine fuel.

The several identical motive power plants of the complementary rotor-blades are each supplied from a central fuel tank rotatable with the rotor, and the fuel supply is under control of an electrically operated injector; a mechanically controlled supply of air, compressed under energy of centrifugal force and mixed with the atomized fuel provides the fuel mixture for the internal combustion engine or motive power plant; and an electrical ignition system including an igniter or spark plug is timed to cause the combustion of successive charges of the fuel mixture and consequent jet-impulses for driving the rotor. Each power plant also includes an automatically operating jet-valve mechanism controlling the discharge of power impulses for revolving the rotor, and other accessories that insure efficient operation of the rotor.

The invention consists in certain novel combinations and arrangements of component parts cooperating as above indicated, as will be more specifically set forth and claimed.

In the accompanying drawings I have illustrated one complete example of the physical embodiment of my invention wherein the parts are combined and arranged according to one mode I have thus far devised for the practical application of the principles of my invention, but it will be understod that changes and alterations may be made in these exemplifying drawings, within the scope of my appended claims, without departing from the principles of the invention.

Figure 1 is a top plan view of a two-blade rotor, showing by arrows the direction of rotation, indicating by dotted lines the arrangement of parts about the center of rotation, and diagrammatically showing the electrical controls for the rotor.

Figure 2 is a rear elevation view of the rotor in Fig. 1 indicating the fixed swivel-support for the rotor mounted on a portion of the fuselage of an aircraft.

Figure 3 is a diagram showing the cycle wherein two jet-impulses or discharges occur in each revolution of the rotor; and Figure 4 is a similar diagram showing the cycle wherein one jet-impulse is discharged in each revolution of the rotor.

Figure 5 is an enlarged vertical sectional view showing one of the two identical blades of a rotor, together with its swivel support, and accessories therefor, at line 5—5 of Fig. 6.

Figure 6 is a top plan view of the structure in Fig. 5, parts shown in section for convenience of illustration.

Figure 7 is an enlarged detail transverse sectional view at line 7—7 of Fig. 6.

In equipping an aircraft with structural parts of the invention a central tubular swivel-bearing post 1 having an attaching flange is bolted to a suitable fixed portion of the fuselage indicated at F in Fig. 2, and a swivel-head, hollow hub, or bearing housing 2 here shown as cubical in shape is supported in elevated position and horizontally journaled by a circular ball bearing 3 about the swivel post 1. The usual and appropriate retaining plates 5 are threaded upon the upper end of the post and locked by suitable nuts to hold down the ball bearing.

In the illustrated form of the invention I employ two diametrically arranged hollow blades 6 and 7, each united with the hollow bearing head 2 by means of a flanged collar or tubular fitting 8 and attaching bolts 9, so that the blades of the rotor revolve or rotate in the direction of the arrows in Figure 1 with the rotatable bearing head 2.

These blades and their equipment are identical so that a description of the construction and operation of one blade will suffice for both blades. The hollow blades are of approved construction and material, and they may be reinforced in usual manner as by an interior longitudinally extending I-beam 10, and an adequate number of transverse webs or braces 11 in Fig. 7; and the blades are fashioned with an obtuse leading edge 12 and a sharper trailing edge 13, together with a flat horizontal plane lower face and an upper rounded face.

A supply of liquid fuel, for commingling with air for the fuel mixture, is carried in a storage tank 14 located below the plane of the blades, and mounted by brackets 15 at the underside of the central rotary bearing head or housing, to rotate with the blades. As indicated in Fig. 5, the fuel tank is of inverted truncated cone shape surrounding the lower portion of the bearing head and the upper portion of the swivel-post, and the tank is of sufficient capacity for supplying liquid fuel to the two internal combustion engines or motive power plants of the blades.

Within each blade is mounted a longitudinally extending air duct 16 opening at its inner end into the hollow bearing-head, and closed at its outer end by a vertically arranged transverse valve plate or partition 17 having an exterior flange to which the angular casing of the combustion appliance is attached by bolts or rivets. The angular casing is located within the hollow blade, and it includes a longitudinally extending barrel or cylinder 18 closed at one end by the wall or valve plate 17 to form a mixing and compressing chamber, and an angular tapering nozzle 19 is extended from the compression chamber transversely of the blade toward the trailing edge of the blade where it terminates in a discharge or jet outlet 20.

The combustible liquid fuel from the supply tank 14 is supplied, under centrifugal pressure to the interior of the mixing and compression chamber through a feed pipe 21 coupled at 22 to the outer peripheral portion of the annular tank, and this pipe, which enters one of the interior compartments of the blade extends outwardly and emerges from the interior of the blade for connection with an electrically controlled injector 23 mounted in a wall of the compression chamber with its atomizing nozzle 24 projecting a suitable distance into the chamber 18.

The fuel injector is electrically controlled by a solenoid S, shown in dotted lines in Fig. 6, and the solenoid is activated to inject a full charge of fuel into the compression chamber by an electrical impulse through an electrical injection circuit, under control of the revolving or rotating rotor. This control circuit includes the grounded wire 25 in Fig. 6, and the lead 27 which extends inwardly toward the bearing head at the center of the rotor where it is connected to a brush 28 that revolves with the head around a fixed cylindrical and insulated commutator 29 that is provided with a pair of diametrically arranged conducting segments 30 and 31.

This commutator 29 is mounted rigidly on the upper end of a central tubular post 32, through which the wires 33 and 34 of the fuel circuit lead upwardly from the control switches 35 and 36, and a battery is indicated at 37 as a source of electrical energy for the operation of the fuel injecting circuit.

Air or oxygen, under automatic mechanical control, is supplied to the mixing and compression chamber 18, from the central hollow bearing head, for commingling with the atomized liquid fuel, and this fuel mixture is compressed, under centrifugal force created by the revolving rotor, in the mixing chamber 18 and the combustion chamber 19 of the power unit located at the outer extremity of the blade.

For controlling and regulating this air supply a spring-seated air valve 38 opens and closes a port 39 fashioned in the transverse wall or partition 17 of the power unit, and the stem 40 of the valve which is reciprocable in a bearing of the wall, extends inwardly through the air duct 16, through an inner bearing plate 41 of the tubular fixture 8, and the inner end of the stem is equipped with a cam-head 42. For seating the valve a spring 43 is coiled about the inner end of the stem and interposed between the cam-head and the bearing plate 41. The air valve is opened intermittently and successively under a cam-action activated by the revolving rotor, through successive contacts of the spring pressed head 42 with a pair of diametrically arranged peripheral cams 44, 44, rigidly mounted, above the swivel-post 1, upon the upper end of a fixed tubular cam-post 45.

As the blade revolves about the swivel-center the spring seated valve 38 is thus successively opened by cam-action, and the centrifugal force of the revolving rotor forces air under pressure through the duct 16 and open port 39 into the mixing and compression chamber 18 and combustion chamber 19, where the fuel mixture is compressed for ignition.

The compressed fuel mixture is ignited electrically, as by means of a spark plug 46, which receives timed electrical high tension impulses through wire 47 from an induction coil 48 that is provided with a vibrating interrupter 49. The induction coil is mounted within the hollow blade, and its primary receives timed currents of electricity through a brush 50 (similar to brush 28) that revolves about the commutator and contacts or coacts with the conducting segments 30, 31 for making and breaking the flow of electricity through the inductance coil 48. The spark plug, of course, is mounted in a wall of the combustion chamber 19 with its points projecting within the chamber for igniting the compressed fuel mixture therein, and discharge a jet-blast through the discharge port 20 of the nozzle 19.

For controlling and utilizing the motive power developed from combustion of the fuel mixture within the power unit, a spring-seated jet valve 51 alternately and successively opens and closes the discharge port 20 of the jet nozzle. The stem 52 of this discharge valve, which extends through the combustion chamber 19 transversely of the blade is reciprocable in suitable slide bearings, as 53, and the rear end of the stem is provided with a retarding head or slide piston 54 that is reciprocable in a cylindrical casing 55 in which a coiled spring 56 is mounted and bears against the rear end of the slide piston, tending to close or seat the valve 51 in the port 20.

As indicated by the arrows in the drawings the rotor revolves counterclockwise about the central commutator, cam post and swivel-post, and in the form of the invention disclosed in the drawings, at each of two diametrical points in a revolution of a blade, due to cam action, a charge of fuel mixture is compressed within the combustion chamber and the compression chamber. This compression within the interior chambers attains an intensity of ample magnitude that, impinging on the front face of the piston or plunger 54 and compressing the spring 56, withdraws the jet valve from its seat to open the discharge port. The electric spark plug 46 is timed to ignite a charge twice during each revolution of the blade, after the jet valve is opened, or synchronously therewith, to ignite the combustible charge, and the ignited charge is exhausted through the port 20.

After this thrust on the blade, and the combustion pressure is diminished within the chambers, the spring 56 expands and closes the jet valve in its seat, but this spring actuated movement is initially retarded by the diminishing pressure within the chambers and exerted on the front face of the piston, in order that the revolving blade will cause a cam-action to open the air valve 38 and permit a blast of air through the chambers to scavenge the chambers of exhaust gas, and to aid in maintaining a comparatively low temperature in the walls of the chambers. This scavenging blast through the chambers and the exhaust port also aids in the propulsion of the blade. After the pressure is exhausted from the chambers, the jet valve is closed, and remains closed while the blade is revolving through one hundred and eighty degrees to a point diametrically opposite to the position of the blade in Figs. 5 and 6.

Figure 3 is a diagram representing a rotor with two blades each having two discharge cycles per revolution, the diametrically opposed discharge sectors being indicated as B and D, and the two larger compression sectors indicated as A and B. The arrow indicates the counter-clockwise movement of the rotor, and the fuselage axis of the aircraft is indicated by the legends Fore and Aft.

The jet thrust is controlled within certain limits by varying the duration of the electrical current impulse sent from the battery 37 through the commutator 29 to the injector solenoid 23, and the quantity of liquid fuel injected at a certain rotor velocity is proportioned to the duration of the injection period.

Under these conditions, both of the control switches 35 and 36 are closed, and the two diametrically arranged conducting segments 30, 31, co-operate with the brush 28 to give two electrical impulses to the injector during each revolution of the blade.

With the jet discharges of each blade adjusted to equal intensity, the thrusts from the two balanced blades in the sectors B and D are equalized, and they form a couple that maintains the rotor in a counter-clockwise spin, in the direction of the arrow in Fig. 3. With the swivel-post in vertical position, or perpendicular to the earth, no horizontal force is applied to the rotor or to the aircraft on which it is mounted; but the injection may be timed and the driving thrust may be regulated to impart to the rotor a lifting motion equal to the total weight of the aircraft, thus enabling the aircraft to hover above a given spot.

To describe a vertical descent of the aircraft, the injection time and the driving thrust are decreased; and by increasing the injection time and the driving thrust of the rotor the aircraft will ascend vertically.

Forward motion of the aircraft results when the rotor revolves in the cycle indicated in the diagram of Fig. 4 where one jet-driving impulse is imparted to the rotor and aircraft during a revolution of a blade, the single discharge sector being indicated at B.

For this purpose, one of the electrical control switches 35 or 36, is opened while the other remains closed to complete the operating circuit for each blade, and the brushes ride over one of the stationary conducting segments of the commutator that has been de-energized, to cut out the discharge sector D.

The sole discharge of motive power through the sector B accelerates movement in the direction of thrust and approximately in the direction parallel to the longitudinal axis of the aircraft, until the aircraft in flight attains a velocity where the air resistance to the forward motion will equal the total jet thrusts produced in the discharge sector B; forward motion thus results when there is only one discharge cycle per revolution of a blade. The swivel-post, and other stationary parts and appliances supported thereby, remain in approximately vertical position during these cycles, and tilting of the rotor is unnecessary in acquiring horizontal or forward movement of the aircraft.

Forward motion also results when the jet thrusts are increased in the discharge sector B and decreased in the discharge sector D, in Figure 3. The difference in the thrusts on opposite sides of the fuselage longitudinal axis will accelerate the flight of the aircraft until the air resistance against the forward motion will equal the difference between the thrusts.

In some instances two rotors, with their multiblades, and revolving or rotating in opposite directions, can be combined to propel the aircraft, and they will have working discharge sectors on opposite sides of the longitudinal axis of the aircraft to attain forward movement of the aircraft.

Various changes and alterations may be made in the physical embodiment of the invention as illustrated in the exemplifying drawings; for instance, more than one motive power plant may be installed in each of the two blades of a rotor with consequent changes or alterations in the controls therefor. These and other contemplated modifications come within the scope of the principles of my invention as set forth in the appended claims.

Having thus fully described my invention, what I claim as new and desire to secure by Letters Patent is:

1. In a jet propulsion mechanism including a fixed central swivel-post having a rotary hollow bearing head journalled thereon, a hollow rotor blade rigidly mounted on the head, an annular fuel tank surrounding the lower portion of the bearing head and carried thereby immediately below the rotor blade and rotatable with said bearing head and said blade, and a motive power unit carried by the outer end of the blade, the improvement comprising a longitudinally extending air duct in said blade communicating at its inner end with said bearing head, a transverse partition adjacent the outer end of said blade separating the motive power unit from said blade, a supply pipe communicating with said fuel tank and said motive power unit for supplying fuel to said unit by means of centrifugal pressure, a jet outlet for said motive power unit at the trailing edge of the blade, an electrically controlled fuel injector connected to said motive power unit and said supply pipe for controlling the admission of fuel to said motor power unit, a spring biased air valve in said partition for controlling the admission of air into said motive power unit, means coacting with said swivel-post for controlling said air valve and said fuel injector and a spark plug for said motive power unit for igniting the mixture of air and fuel in said motive power unit.

2. In a jet propulsion mechanism as in claim 1 wherein the means coacting with the valve for controlling the admission of air into said motive power unit comprises a pair of diametrically arranged cams on said swivel-post, and a stem on said valve having one end thereof in alternate engagement with said cams.

3. In a jet propulsion mechanism as in claim 1 wherein the means coacting with the fuel injector for controlling the ejection of fuel into said motor power unit comprises a commutator on said swivel-post, a brush on said bearing head for contact with said commutator, a circuit connecting said brushes and said fuel injector and said commutator with a source of current and switches interpositioned in said circuit for controlling the operation of said fuel injector.

HELGE S. G. SVENSON.

REFERENCES CITED

The following references are of record in the file of this patent:

UNITED STATES PATENTS

| Number | Name | Date |
| --- | --- | --- |
| 1,021,521 | Heroult | Mar. 26, 1912 |
| 1,025,618 | Fish | May 7, 1912 |
| 1,263,475 | Shepard | Apr. 23, 1918 |
| 1,820,946 | Pitcairn | Sept. 1, 1931 |
| 2,330,056 | Howard | Sept. 21, 1943 |
| 2,397,357 | Kundig | Mar. 26, 1946 |
| 2,415,584 | Fleiss | Feb. 11, 1947 |
| 2,514,749 | Dobbins | July 11, 1950 |

FOREIGN PATENTS

| Number | Country | Date |
| --- | --- | --- |
| 6,380 | Great Britain | Mar. 16, 1904 |